Figure 1:
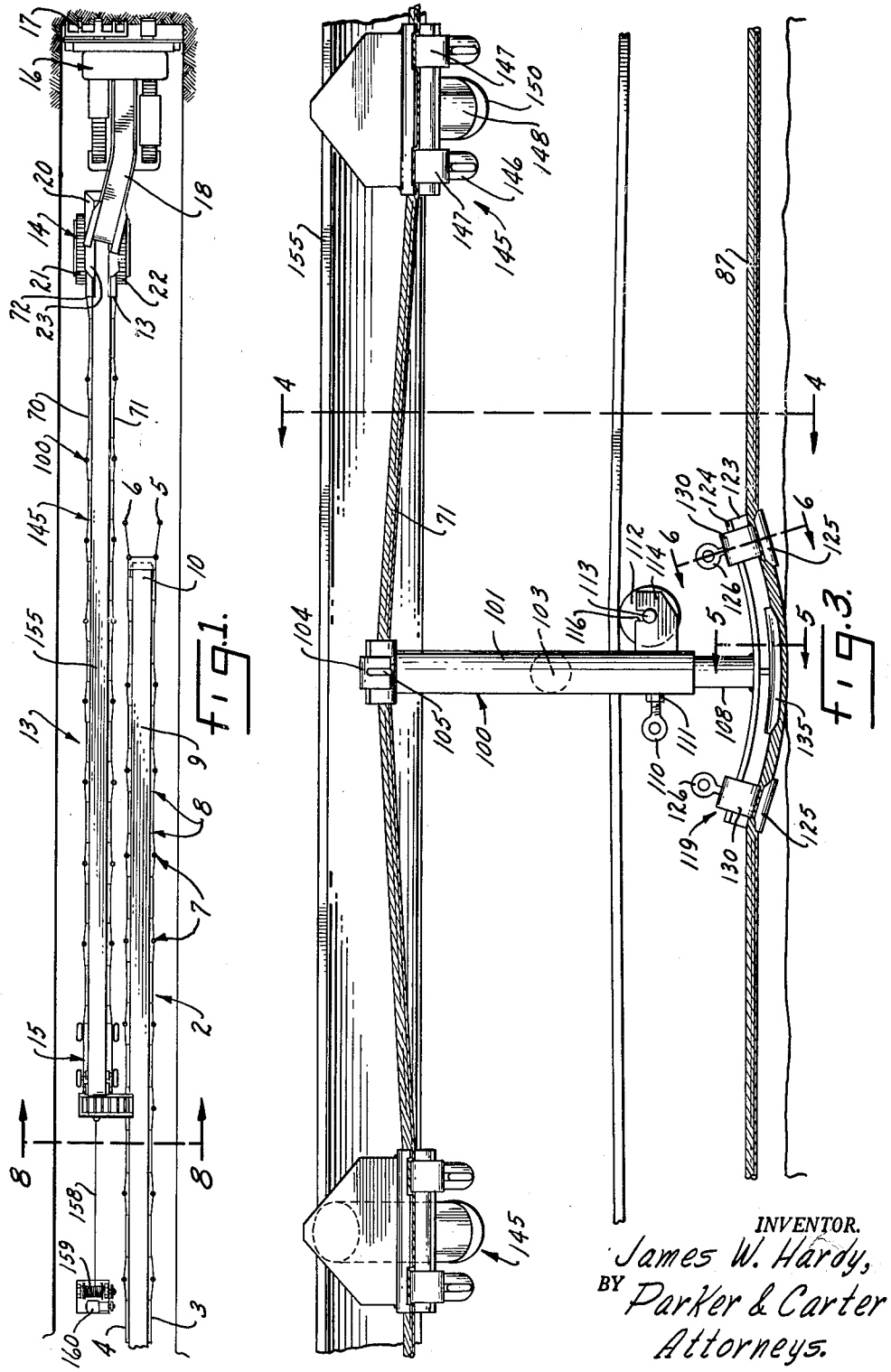

April 14, 1964  J. W. HARDY  3,128,869
CONTINUOUSLY MOVABLE CONVEYOR SYSTEM
AND METHOD OF CONVEYING MATERIAL
Filed July 20, 1960  3 Sheets-Sheet 1

INVENTOR.
James W. Hardy,
BY Parker & Carter
Attorneys.

April 14, 1964 J. W. HARDY 3,128,869
CONTINUOUSLY MOVABLE CONVEYOR SYSTEM
AND METHOD OF CONVEYING MATERIAL
Filed July 20, 1960 3 Sheets-Sheet 2

INVENTOR.
James W. Hardy,
BY Parker & Carter
Attorneys.

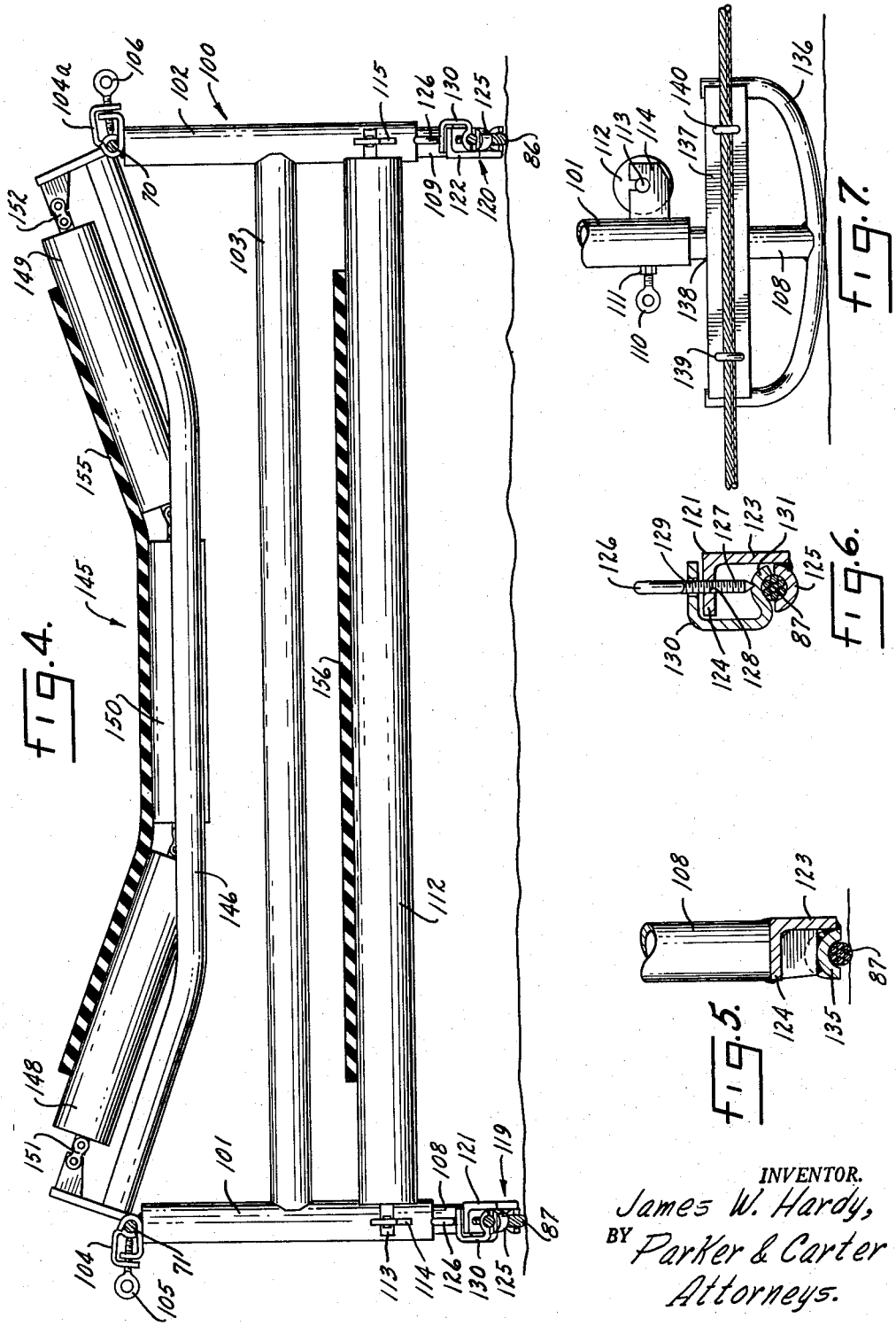

United States Patent Office 3,128,869
Patented Apr. 14, 1964

3,128,869
CONTINUOUSLY MOVABLE CONVEYOR SYSTEM AND METHOD OF CONVEYING MATERIAL
James W. Hardy, Chicago, Ill., assignor to Goodman Manufacturing Company, Chicago, Ill., a corporation of Illinois
Filed July 20, 1960, Ser. No. 44,052
7 Claims. (Cl. 198—96)

This invention relates in general to belt conveyors and more particularly to a unique system for continuously extending a belt conveyor following a working face in a mine without the use of shuttle cars and with little or no shut-down time.

Flexible belt conveyors find general use in industries, such as mining, where large amounts of bulk material must be rapidly and efficiently transported from a loading area to a discharge area.

In coal mining operations, conveyors are often utilized in transporting coal from the actual mining operation to a storage area or transportation means such as a mine car. Since a mining operation may be continuously moving at a variable pace, the loading area may be continually changing. This would be the case with a continuous coal mining machine, for example.

A considerable amount of time and labor is required to keep many present conveyor systems operating at peak efficiency. Shuttle cars are often used to carry ore from the mining face to the tail section of a conventional conveyor, for example, as the mining operation inches forwardly. In such cases, the mining and/or shuttling operation must be shut down while the conveyor is extended so as to remain within a prescribed distance of the mining face.

Accordingly, the primary object of this invention is to provide an extensible conveyor system for continuously bridging the gap between a moving loading area and the tail end of a fixed conveyor.

Another object is to provide a shuttle conveyor which can be moved along behind the mining operation in toto to thereby eliminate time and labor consuming dismantling and reassembling operations.

Still another object is to provide a conveyor which can be continuously moved during conveyor operation and, consequently, eliminates the need for shuttle cars.

Yet another object is to provide a self-propelled shuttle conveyor.

Still another object is to provide a combination shuttle conveyor and fixed conveyor system which need be shut down for only short periods during a working shift.

Yet another object is to provide a shuttle conveyor of the aforementioned character which does not become misaligned during movement along the mine run.

Still another object is to provide a rope sideframe shuttle conveyor which is continuously movable on rope connected skids.

Another object is to provide a shuttle conveyor of the aforedescribed character which is simple in construction and economical to manufacture and operate.

Another object is to provide a method for continuously handling and conveying mined material from a moving mining area.

These and other objects of this invention will appear from time to time in the following specification and claims.

Figure 2:
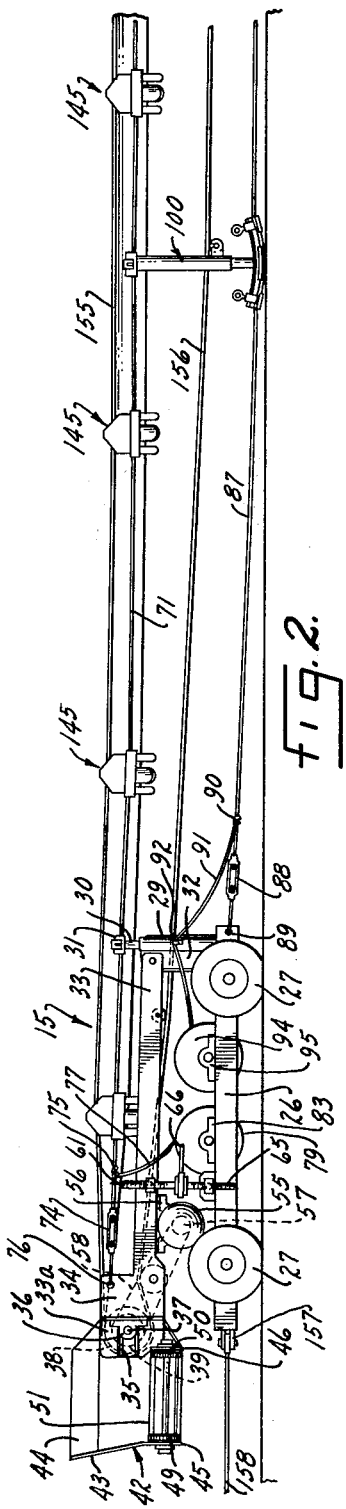
Figure 8:
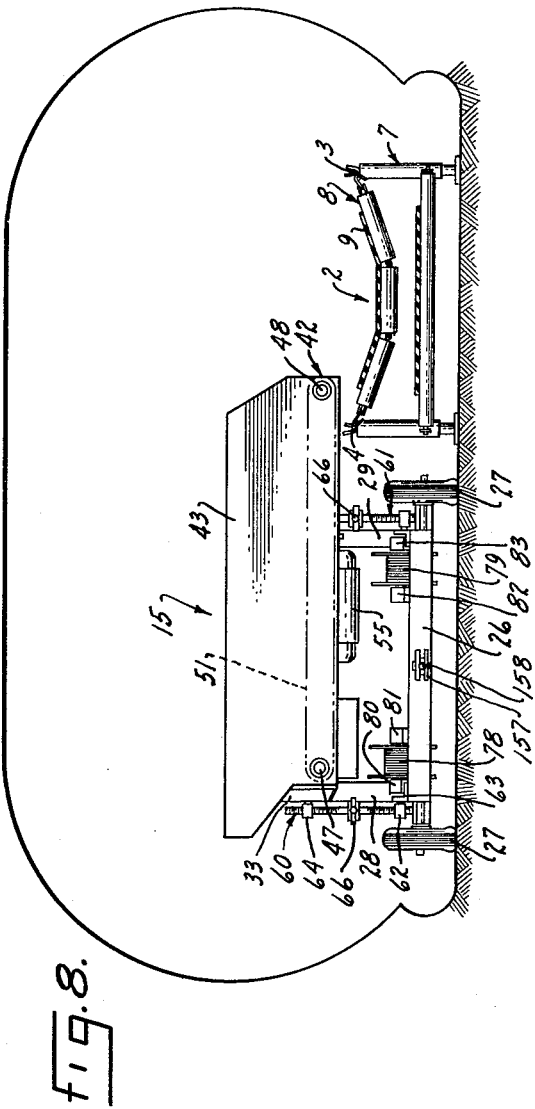

The invention is illustrated more or less diagrammatically in the following drawings wherein:

FIGURE 1 is a plan view of a conveyor system embodying this invention,

FIGURE 2 is a side elevation to an enlarged scale of a portion of the auxiliary conveyor of FIGURE 1 showing the head or discharge end, FIGURE 3 is a detailed side elevation to an enlarged scale of a portion of the aforementioned conveyor showing a support standard, FIGURE 4 is a view taken along line 4—4 of FIGURE 3, FIGURE 5 is a detailed view with parts in section of the base of a support standard taken along line 5—5 of FIGURE 3, FIGURE 6 is a detailed view with parts in section showing a support standard skid and a ground rope clamped thereto taken along line 6—6 of FIGURE 3, FIGURE 7 is a detailed view showing a portion of another embodiment of a support standard, and FIGURE 8 is a detailed view taken substantially along the line 8—8 of FIGURE 1 showing the discharge end of a shuttle conveyor and the associated conventional fixed conveyor.

Like reference numerals identify like parts throughout the specification and drawings.

A conventional fixed conveyor is shown generally at 2 in FIGURE 1. The conveyor includes longitudinally extending wire ropes 3 and 4, each rope having an end anchored at 5 and 6, respectively. A series of generally regularly spaced support standards 7 carry the wire ropes 3 and 4 at their upper extremities and troughing idler assemblies 8 are suspended from the ropes at generally regularly spaced intervals. A conveyor belt 9 is supported on the bed formed by the troughing idler assemblies. The conveyor belt 9 is tensioned between tail section and a head section, not shown, by any suitable means.

Adjacent the fixed conveyor 2 and extending longitudinally thereof is a rope sideframe shuttle conveyor shown generally at 13. The shuttle conveyor includes a tractor 14 at its tail end and a carriage 15 at its head end. A continuous mining machine 16 having a cutting mechanism 17 and an overhead discharge conveyor 18 is positioned directly in front of the tractor 14. It will be understood, however, that any type of mining and loading operation might take the place of mining machine 16 and conveyor 18.

The tractor 14 includes a framework 20 supported by endless traction means 21 and 22. Mounted on the framework is a conveyor belt idler roller, not shown, and a conventional power source for driving the tractor. An apron 23 directs the material from the overhead conveyor 16 onto the shuttle conveyor belt.

Carriage 15, as best shown in FIGURES 2 and 8, includes a framework 26 supported for movement on wheels 27. A pair of upstanding arms 28 and 29 are mounted on one end of the framework 21 and include extensible sections 30 having rope seats 31 mounted on top thereof. Ears 32 extend rearwardly of the arms 28 and 29 and booms 33 are pivotally connected thereto in trailing relationship, as at 34. Forming the trailing ends of booms 33 are vertically extending plates 33a. Each of the plates 33a has a longitudinally extending slot 35 therein in which pillow blocks 36 are seated for longitudinal adjustment relative thereto. A shaft 37 is rotatably carried between opposed pillow blocks 36. Shaft 37 carries a conveyor drive roller 38, and a sprocket wheel 39 is located adjacent one of its ends.

Suspended from the plates 33a is a laterally extending conveyor shown generally at 42. Conveyor 42 includes an upstanding deflector wall having wall sections 43 and 44 forming an enclosure at one side of the conveyor and on one end thereof. Transversely extending sideframe member 45 forms the lower portion of side wall 43 and an identical sideframe member 46 is secured to the back wall 44 at one end thereof and extends beneath the conveyor belt driving roller 38 where it is secured by conventional means to plates 34. The end wall 44 is also secured to a plate 33a to secure the conveyor 42 to the booms 33. Shafts 47 and 48 extend between the transversely extending sideframe members and are rotatably mounted therein. Sprockets 49 and 50 are mounted on each of the shafts 47 and 48 and receive chains supporting a conveyor surface 51. Conveyor surface 51 may be of lath construction, as shown, or any other suitable construction. The conveyor is driven from any suitable source, such as motor 55.

Electric motor 55 is suspended from pillow blocks 56 and provides power for the driving roller 38. The motor has a take-off sprocket 57 mounted on its drive shaft and a chain 58 connects sprockets 57 and 39.

A pair of boom elevating jacks are indicated generally at 60 and 61. Each jack includes an internally threaded ring 62 pivotally secured to a block 63 mounted on the framework 26. Identical internally threaded rings 64 are pivotally connected to the booms 33 immediately above corresponding rings 62. Threaded shafts 65 having opposed threads on their opposite ends extend into threaded engagement with corresponding rings 62 and 64 and a ratchet arm 66 is secured to each of the shafts 65 generally midway between the threaded ends to provide means for turning the shafts and, consequently, raising and lowering the booms.

A pair of wire ropes 70 and 71 are anchored by conventional means as at 72 and 73, respectively, to the tractor 14. These ropes extend forwardly to the carriage 15 where they pass over and are secured in rope seats 31. Turnbuckles 74, which include friction clamps 75, grip corresponding ropes in clamps 75 and are connected to the plates 34, as at 76. The turnbuckles 74 maintain tension in the ropes 70 and 71. The free ends 77 of these ropes are wound on drums 78 and 79 supported from the framework 27 on pillow blocks 80, 81 and 82, 83, respectively, for rotation relative thereto. As is best seen in FIGURE 8, the drums 78 and 79 each carry a substantial supply of wire rope.

Another set of wire ropes 86 and 87 extend substantially at ground level between tractor 14 and carriage 15. Ropes 86 and 87 are anchored to tractor 14 in a conventional manner. At the carriage end, the ropes are secured to turnbuckles 88 which are in turn connected to the carriage at 89. Turnbuckles 88 are secured to the wire ropes by friction clamps 90 similar to clamps 75. The turnbuckles maintain tension on the ropes while the free ends 91 of the ropes are passed over guides 92 on the arms 29 and stored on drums 94 rotatably mounted in pillow blocks 95 carried by the framework 26.

Support standards 100 are spaced at regular intervals in longitudinal alignment along the path of ropes 70, 71 and 86, 87. As is best seen in FIGURES 3 and 4, each standard 100 comprises a welded tubular framework having upstanding legs 101 and 102 and a cross bar 103. Rope clamps 104 and 104a are secured, as by welding, to the upper ends of the legs 101 and 102. The clamps include tightening eye bolts 105 and 106 which force the strands 70 and 71 into snug engagement with seats in the clamps.

Slidably received in the lower ends of the legs 101 and 102 are telescoping extensions 108 and 109. The extensions are vertically adjustable within the legs 101 and 102 and can be secured in any position relative thereto by lock screws 110 which screw into threaded apertures 111 in the legs and bear against the extensions.

Ears 114 and 115 extending from legs 101 and 102 support a return roller 112 mounted for rotation on the dead shaft 113, as is best shown in FIGURE 3. The ears may be secured to the legs by welding or the like and each has an aperture 116 on the upper edge to receive the ends of the dead shaft 113.

In the embodiment of this invention shown in FIGURES 3-6, telescoping extensions 108 and 109 are secured by welding or the like to arcuately shaped skids 119 and 120. The skids are formed from angle irons 121 and 122 which include downwardly extending legs 123 and horizontally etxending legs 124. Trough shaped seats 125 are secured adjacent each end of the angle irons by welding or the like.

As is best shown in FIGURE 6, a wing screw 126 having a threaded portion 127 is threaded through internally threaded aperture 128 in the leg 124 at each end of the angle iron. Wing screw 126 extends in a loosely fitting manner through an aperture 129 in a flanged-shaped clamp 130 having an inverted trough-shaped lower leg 131 against which the threaded portion of the wing screw bears. The wire ropes 86 and 87 are seated in the trough seats 125 and clamped thereto by the leg portion 131 held in fixed relationship by the threaded wing screws 126.

An inverted trough-shape rope seat 135 is secured by welding or the like to angle irons 121 and 122, as best seen in FIGURES 3 and 5. The wire ropes 86 and 87 pass underneath the inverted trough-shaped rope seat 135 to rest on the surface of the ground and support each stand for sliding movement.

A second embodiment of the invention is shown in FIGURE 7. Here, a U-shaped tubular skid 136 is secured to the lower ends of each of the telescoping extensions 108 and 109 by welding or the like. The skids carry cross plates 137, which are also secured by welding or the like to the extension itself, as at 138. U-clamps 139 and 140 extend through apertures in the plates 137 and are bolted thereto in a conventional manner to secure wire ropes 86 and 87 to the base of each of the support standards.

Suspended from the longitudinally extending wire ropes 70 and 71 at generally regularly spaced intervals are troughing idler assemblies, shown generally at 145. The idler assemblies are of a conventional construction and include a rigid framework 146 secured at its opposite ends to the wire ropes 70 and 71 by rope clamps 147. A pair of wing rollers 148 and 149 are pivotally connected in articulated relationship by a center roller 150 and pivotally suspended in the rigid framework 146 as at 151 and 152 in a conventional manner.

A conveyor belt having a carrying reach 155 supported by the troughing idler assemblies 145 and a return reach 156 carried by the return rollers 112 extends between the adjustable drive roller 38 on the carriage 15 and the tail pulley (not shown) on the tractor 14.

Secured to the lower end of framework 26, as at 157, in a conventional manner is a cable 158 which is wound on a drum 159 forming a part of a torque winch 160. The torque which is designed to pay out cable 158 when the tension on the cable exceeds a predetermined amount. The function of the torque winch and cable 158 will be hereinafter explained.

The use, operation and function of this invention are as follows:

As hereinbefore set out, wherever a loading operation must be continuously moved to follow a mining operation or the like, the problem of providing an adequate conveyor system arises. The shuttle conveyor 13 of this invention in combination with a fixed conveyor 2 provides an ideal solution to this problem.

For example, in punch mining, wherein a mining operation normally moves horizontally into the face of a high wall so as to actually tunnel out the coal, a continuous mining machine is frequently used. An illustration of this is shown as an example in FIGURE 1. The fixed conveyor, comprising a series of individual sections which might be 100 to 150 feet long, for example, is set up as is shown in FIGURE 1 with one end of the ropes anchored to the tunnel floor, as is shown at 5 and 6.

The shuttle conveyor might be set up for any length, although a length of in the neighborhood of 200-300 feet is commonly employed. This is accomplished by providing a suitable number of support standards 100 and reeling a proportionate amount of rope from the drums 78, 79 and 94. When the ropes are extended to the predetermined length, for example 300 feet, the turn buckles 74 and 88 are friction clamped to the respective wire ropes as at 75 and 90. The torque winch 160, which is anchored to the ground at the head of the carriage 15 with its cable 158 extended to connect with the frame 26 of the carriage, maintains the tension in the ropes against the pull of the tractor 14.

As is best shown in FIGURES 2 and 8, the discharge conveyor 42 extending transversely of the carriage can be adjusted as to height by the jacks 60 and 61 on either side of the framework. In operation the tractor unit 14, which is self-propelled by conventional means, moves forwardly as it follows the continuous miner and its overhead delivery conveyor 18. Having pre-established the length of the shuttle conveyor by reeling out the wire ropes to a predetermined length, the forwardly moving conveyor moves against the bias of the torque winch 160. The torque winch is of a conventional construction and is preset to pay out cable 158 when more than a predetermined force is exerted by the tractor 14. Consequently, the ropes of the conveyor 13 remain taut and the conveyor slides along on the skid supported standards.

In one embodiment of the invention, as shown in FIGURES 2 to 6, the ropes 86 and 87 actually provide the ground contacting surface of the conveyor. This arrangement prevents tilting of the standards with its attendant disadvantages, such as misalignment of the conveyor assembly.

In another embodiment of the invention, shown in FIGURE 7, tubular skids are provided and the ropes 86 and 87 lie substantially above the mine floor so as to remain completely out of contact therewith. Little friction is developed, however, by the curved tubular slides 136 which maintain minimum contact with the ground.

When the shuttle conveyor 13 has moved forwardly in following the continuous miner to a point where the tractor is in the neighborhood of about 200 feet in advance of the anchored ends 5 and 6 of the fixed conveyor 2, preparations can be made by a working crew to add another section to the tail of the fixed conveyor. The shuttle conveyor, being in the neighborhood of 300 feet long, can continue to move forwardly in following the mining operation to deliver coal to the fixed conveyor 2 while these preparations are taking place. At a convenient time, for example between work shifts, when the entire mining operation might be shut down for a half hour or so, the belt 9 of the fixed conveyor 2 can be broken at its splice and a 300 foot section of belt inserted between the ends thereof. Tail section 10 of the fixed conveyor can then be moved forwardly approximately 150 feet while the side ropes 3 and 4 remain anchored at 5 and 6. When the tail section 10 has been braced as by jacks or the like, additional rope sections can be inserted and drawn tautly over the rope seats of the newly established series of support standards whereupon troughing roller assemblies can be suspended from the ropes to complete the section-adding operation. This operation of adding a section to the fixed conveyor in a short period of time results in minimum down-time and, consequently, maximum production.

The shuttle conveyor in combination with the rapidly extensible fixed conveyor provides a simple and inexpensive assembly for delivering coal or the like from a moving loading area to a fixed discharge area. The whole shuttle conveyor can be set up quickly and easily at the mouth of a mine passage, for example, and towed in by the traction means at its head without realigning or readjustment before operation. It will thus be seen that the assembly can be completed where head room is available with little or no trouble.

The tension in the individual upper ropes 70 and 71 can be adjusted separately through turnbuckles 74 to provide proper belt training while the tension in the lower ropes can also be properly adjusted to assure skidding travel without "walking" of the support stands. Any rope adjusting means might be utilized and turnbuckles are shown only as an example.

The conveyor belt on the shuttle conveyor may be adjusted separately of the flexible wire ropes by means of the longitudinally adjustable pillow blocks 36 mounted on the plates 33a.

It will be understood that the conveyor belt need not be of a fixed length on the shuttle conveyor 13, and depending upon the arbitrary predetermined length established as a function of the operational requirements, a conveyor belt of any length might be utilized. Greater belt lengths necessitate only the extension of more wire rope from the drums on the discharge carrier and the addition of more support standards between the traction means and the carriage.

It will be understood that what has been provided is a conveyor system employing a shuttle conveyor which is inexpensive to assemble, easy to operate, requires little adjustment during use, and provides a continuously moving conveyor assembly while retaining all the advantages of the rope sideframe conveyor.

Considerable variations could be made on this invention by those skilled in the art without departing from the spirit thereof. Accordingly, it is intended that the foregoing description be considered illustrative only and not definitive and that the scope of the invention be limited only by the appended claims.

I claim:

1. An auxiliary shuttle conveyor, said conveyor including
   a traction means at the tail end of the conveyor,
   a carriage means at the head end of the conveyor,
   a series of vertically extending longitudinally aligned support standards located at intervals between said carriage and traction means,
   said standards having ground-engaging skids at their bases and rope seats adjacent their upper end portions,
   a first pair of ropes stretched between said carriage means and traction means substantially at ground level and secured to the bases of each of said standards,
   a second pair of ropes stretched between said carriage means and traction means and secured to said rope seats,
   retarding means which maintain the pairs of ropes taut when an advancing force is applied to the conveyor by the traction means,
   troughing idler assemblies suspended from said second pair of ropes at intervals and a flexible conveyor belt carried by said troughing idler assemblies,
   said traction means being secured to said ropes so as to continuously move said conveyor over the ground by applying an advancing force to the pairs of ropes of a greater magnitude than the retarding force exertable by the retarding means on the pairs of ropes, and
   means for discharging material carried by the flexible conveyor belt at an angle transverse to the axis of the conveyor.

2. The conveyor of claim 1 further characterized in that the retarding means is a torque winch having a line connected to the head end of the conveyor,
   said torque winch having sufficient torque to maintain tension on the pairs of ropes at all times.

3. The conveyor of claim 1 further characterized in that each rope in said first pair of ropes forms the lowermost portion of its associated support standard base whereby at least portions of each rope in said first pair of ropes form ground engaging skid surfaces.

4. The conveyor of claim 1 further characterized in that the support standards are disposed in pairs longitudinally along the second pair of ropes,
   the support standards in each pair of support standards being located along a line which is substantially perpendicular to the second pair of ropes,
at least a pair of support standards carrying return idler means,
said return idler means being positioned along the second pair or ropes at locations longitudinally spaced from the nearest troughing idler assembly.

5. A method of extending a conveyor system in a mining operation so as to keep pace with the advancing mining face, said method including the steps of
positioning a fixed conveyor, which may be extended, section by section, with its head end at a discharge area and its tail end in the vicinity of a loading area,
positioning a straight movable shuttle conveyor having a length greater than a section to be added to the fixed conveyor alongside the fixed conveyor,
said shuttle conveyor having its head end arranged to discharge onto the fixed conveyor, and its tail end arranged to move with an advancing mining operation,
advancing the shuttle conveyor bodily in a direction generally parallel to the longitudinal axis of the main conveyor a distance no greater than the length of a section of the main conveyor to be added behind an advancing mining operation, and
adding a section to the fixed conveyor of a length at least as great as the distance of advance of the shuttle conveyor when the head end of the shuttle conveyor approaches the tail end of the main conveyor.

6. A method of extending a conveyor system in a mining operation so as to keep pace with the advancing mining face, said method including the steps of
positioning a fixed conveyor, which may be extended, section by section, with its head end at a discharge area and its tail end in the vicinity of a loading area,
positioning a straight wire rope side frame movable shuttle conveyor having a length greater than a section to be added to the fixed conveyor alongside the fixed conveyor,
said shuttle conveyor having its head end arranged to discharge onto the fixed conveyor, and its tail end arranged to move with an advancing mining operation,
advancing the shuttle conveyor bodily in a direction generally parallel to the longitudinal axis of the fixed conveyor a distance no greater than the length of a section of the fixed conveyor to be added behind an advancing mining operation,
maintaining the wire rope side frames of the shuttle conveyor taut while the shuttle conveyor advances, and
adding a section to the fixed conveyor of a length at least as great as the distance of advance of the shuttle conveyor when the head end of the shuttle conveyor approaches the tail end of the fixed conveyor.

7. A method of continuously moving mined material from an advancing face to a fixed storage or loading area including
the steps of positioning a fixed extensible conveyor of substantial length such that its head or discharge end is located at the storage or loading area,
positioning a continuously movable straight shuttle conveyor adjacent the fixed conveyor in side-by-side relationship therewith so that the discharge end of the shuttle conveyor overlaps the receiving end of the fixed conveyor,
continuously moving the shuttle conveyor bodily forward in a direction parallel to the fixed conveyor such that its receiving end follows a moving mining operation,
continuously depositing mined material from the mining operation onto the receiving end of the shuttle conveyor,
moving the material along the shuttle conveyor in a direction parallel to the fixed conveyor as the shuttle conveyor itself moves forwardly,
continuously depositing material from the discharge end of the shuttle conveyor onto the fixed conveyor between the receiving and discharge ends thereof as the discharge end of the shuttle conveyor moves toward the receiving end of the fixed conveyor,
continuously moving material along the fixed conveyor to its discharge end and
continuously depositing material at the fixed storage or loading area.

References Cited in the file of this patent

UNITED STATES PATENTS

| | | |
|---|---|---|
| 1,932,897 | Jaggard | Oct. 31, 1933 |
| 2,452,980 | Beltz | Nov. 2, 1948 |
| 2,674,364 | Cartlidge | Apr. 6, 1954 |
| 2,788,116 | Wood | Apr. 9, 1957 |
| 3,010,567 | LoPresti | Nov. 28, 1961 |
| 3,019,890 | Knill | Feb. 6, 1962 |

FOREIGN PATENTS

| | | |
|---|---|---|
| 535,658 | Italy | Nov. 16, 1955 |